(12) United States Patent
Park

(10) Patent No.: US 8,541,725 B2
(45) Date of Patent: Sep. 24, 2013

(54) SUNLIGHT-TRACKING APPARATUS OF A WALL INSTALLATION TYPE HAVING AN OPENING AND CLOSING HINGE BAR PIVOTALLY CONNECTED IN A HINGE FIXING BAR

(75) Inventor: Young Hwan Park, Pyeongtaek-si (KR)

(73) Assignee: Green Plus Co., Ltd. (KR)

( * ) Notice: Subject to any disclaimer, the term of this patent is extended or adjusted under 35 U.S.C. 154(b) by 267 days.

(21) Appl. No.: 12/940,866

(22) Filed: Nov. 5, 2010

(65) Prior Publication Data

US 2012/0111318 A1    May 10, 2012

(51) Int. Cl.
*G01C 21/02*    (2006.01)

(52) U.S. Cl.
USPC ....................... 250/203.4; 250/239

(58) Field of Classification Search
USPC .............. 250/203.4, 239, 216; 126/683–695; 136/246–259; 359/565, 851–853
See application file for complete search history.

(56) References Cited

U.S. PATENT DOCUMENTS 4,220,137 A * 9/1980 Tesch et al. .................... 126/702

* cited by examiner

*Primary Examiner* — Que T Le

(74) *Attorney, Agent, or Firm* — John K. Park; Park Law Firm

(57) ABSTRACT

Disclosed is an apparatus for tracking and condensing sunlight of a wall installation type which tracks the position of the Sun and efficiently condenses sunlight according to variations of an altitude or orbit of the sun by installing a sunlight condensing device for adjusting an angle onto a wall. An apparatus for tracking and condensing sunlight of a wall installation type, comprises: a wall means 100; a sunlight condensing means 200 for condensing sunlight by forming onto a side surface of the wall means 100; and an opening and closing means 300 for adjusting condensing angle by opening or closing an end of the sunlight condensing means 200.

6 Claims, 5 Drawing Sheets

SUNLIGHT-TRACKING APPARATUS OF A WALL INSTALLATION TYPE HAVING AN OPENING AND CLOSING HINGE BAR PIVOTALLY CONNECTED IN A HINGE FIXING BAR

TECHNICAL FIELD

The present invention relates to an apparatus for condensing sunlight of a wall installation type, and more particularly, to an apparatus for tracking and condensing sunlight of a wall installation type which tracks the position of the Sun and condense sunlight using a wall structure such as factory walls, soundproof walls, open-type structures, steel structures, bulkheads.

BACKGROUND ART

In general, sunlight generation indicates a generation method for converting sunlight directly into electric power via a solar battery.

As compared with other types of electric generation manner, solar energy generation generates clean energy without air pollution, noise, heat generation, vibration, etc., seldom requires fuel transfer and maintenance and management of electric generation equipment, increases a lifespan of an apparatus, and simplifies decision of an equipment scale and installation work.

A sunlight generation system has advantages in that an energy source is clean and infinite, and the generation system is easily maintained and repaired, can be implemented into a unmanned system and has a long lifespan.

FIG. 1 shows a conventional apparatus for condensing sunlight of a fixed type. The conventional apparatus has the cheapest stable structure, and is mostly used in a comparatively remote region where the installation area is not limited. Particularly, the conventional apparatus is normally installed in an island where the wind velocity is stronger. The conventional apparatus adopts an array supporting method relatively often used because initial installation costs are small and no difficulty occurs in repair and management. A domestic sunlight system for an island has been standardized as the fixed type system.

In addition, there may be used an apparatus for two-way condensing sunlight of a fixed type, wherein the foregoing fixed type structures are installed in both directions.

However, the conventional apparatus for condensing sunlight of the fixed type has the problem that the condensing efficiency of the overall system is lowered according to variations of an altitude or orbit of sunlight.

Moreover, since the conventional apparatus is installed mostly on the ground, an installation place thereof is limitative, and when the conventional apparatus is installed on the roof or rooftop, it also have a problem that the apparatus is weak for wind or heavy load.

DISCLOSURE

Technical Problem

Accordingly, the present invention is conceived to solve the aforementioned problems in the prior art. An object of the present invention is to provide an apparatus for tracking and condensing sunlight of a wall installation type which tracks the position of the Sun and efficiently condenses sunlight according to variations of an altitude or orbit of the sun by installing a sunlight condensing device for adjusting an angle onto a wall.

Technical Solution

According to an aspect of the present invention for achieving the above objects, there is provided an apparatus for tracking and condensing sunlight of a wall installation type, comprising: a wall means 100; a sunlight condensing means 200 for condensing sunlight by forming onto a side surface of the wall means 100; and an opening and closing means 300 for adjusting condensing angle by opening or closing an end of the sunlight condensing means 200.

The wall means comprises: a wall 101 formed in an upper or a lower direction vertically; and wall brackets 111 and 117 protruded and formed in an upper end and a lower end of the wall 101, respectively.

In addition, the sunlight condensing means 200 comprises: a hinge fixing bar 105 formed in an upper part of the wall bracket 111 and having a pivoting hinge; an opening and closing hinge bar 106 pivotally connected in the hinge fixing bar 105; a vertical bar 116 extended and formed to an upper or an lower direction vertically from the opening and closing hinge bar 106 to pivot with together; an opening and closing lower bar 110 formed in an end of the vertical bar 116; solar cell 107 for condensing sunlight and formed in front of a structure extended from the opening and closing hinge bar 106, the vertical bar 116, and the opening and closing lower bar 110; and a lower bar 109 formed in the lower end of the wall bracket 117, and connected and supported with the opening and closing lower bar 110.

Here, the opening and closing means 300 comprises: a motor 114; a driving pipe 112 for rotating in left or right direction horizontally by extending to a rotatable axis of the motor 114; a rack pinion 113 for converting a rotating motion of the driving pipe 112 into a linear motion in the left or right direction horizontally; a driven pipe 102 coupled with the rack pinion 113 and performs a linear motion in the upper or lower direction vertically; a pipe roller 103 for fixing the driven pipe 102 onto the wall 101 and smoothly guiding the linear motion in the upper or lower direction vertically; and a push rod 104 for adjusting the angle of solar cell 107 by pushing or pulling to the outside of the wall the opening or closing lower bar 110 according to the upper or lower motion of the driven pipe 102 by coupling an end to the driven pipe 102 by using a pushing rod clamp 108 and by hinge-coupling the other end to the opening and closing lower bar 110.

Moreover, preferably, the pushing rod 104 have an end coupled with the pushing rod clamp 108, and the other end coupled to at least two points of the opening and closing lower bar 110 to be supported.

Also, a plurality of the sunlight condensing means 200 are arranged onto the wall means 100 in horizon or/and vertical direction(s). And the wall means 100 comprises an opening part 115 having each opened space with constant interval among the plurality of the sunlight condensing means 200.

Further, the wall means 100 comprises at least a wall structure selected from factory walls, soundproof walls, open-type structures, steel structures, bulkheads.

Advantageous Effects

According to the present invention, the apparatus for tracking and condensing sunlight of the wall installation type can improve the condensing efficiency according to variations of the altitude or orbit of the sunlight and make better utilization of an installation place using the wall by tracking the position of the Sun and efficiently condensing sunlight according to variations of season or an altitude of the Sun by installing a sunlight condensing device for adjusting the angle onto the wall.

BEST MODE FOR INVENTION

Hereinafter, exemplary embodiments of the present invention will be described in detail with reference to the accompanying drawings.

In the present invention, a wall means a comprehensive wall of factories and other buildings and includes various wall structures such as soundproof walls, open type structures, steel structures, bulkheads, and it also may includes sloping roof or vaulted roof.

Figure 1:
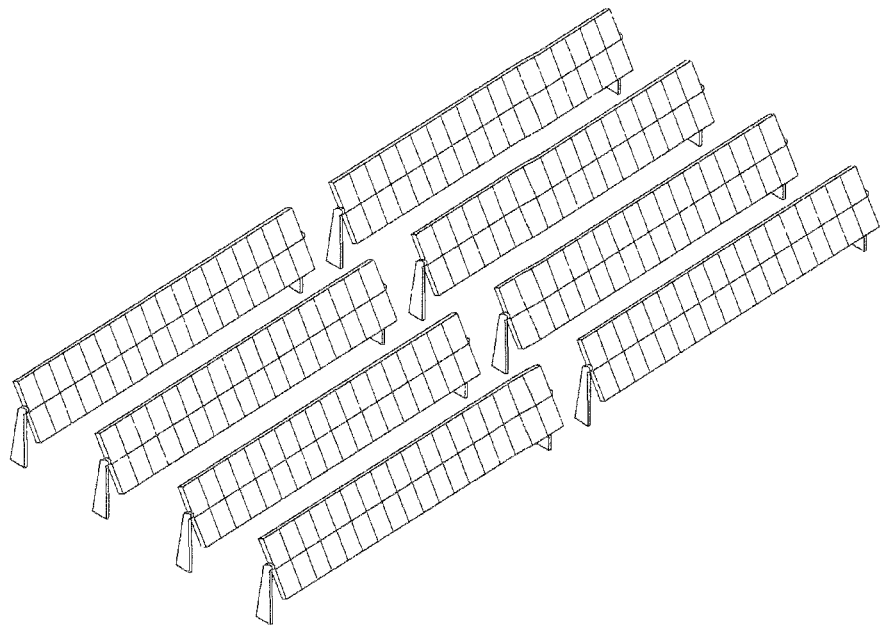
FIG. 1 is a perspective view illustrating a conventional apparatus for tracking and condensing sunlight of a fixed type.
Figure 2:
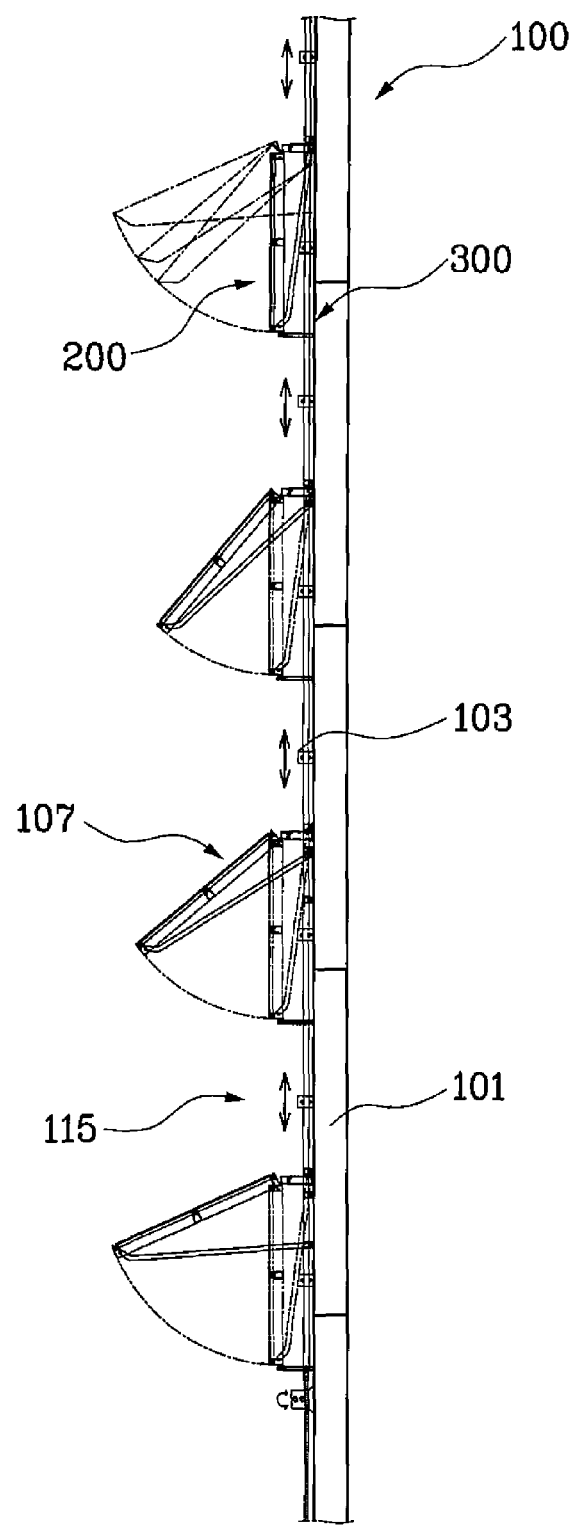
FIG. 2 is a side sectional view illustrating an apparatus for tracking and condensing sunlight of a wall installation type according to a preferred embodiment of the present invention.
Figure 3:
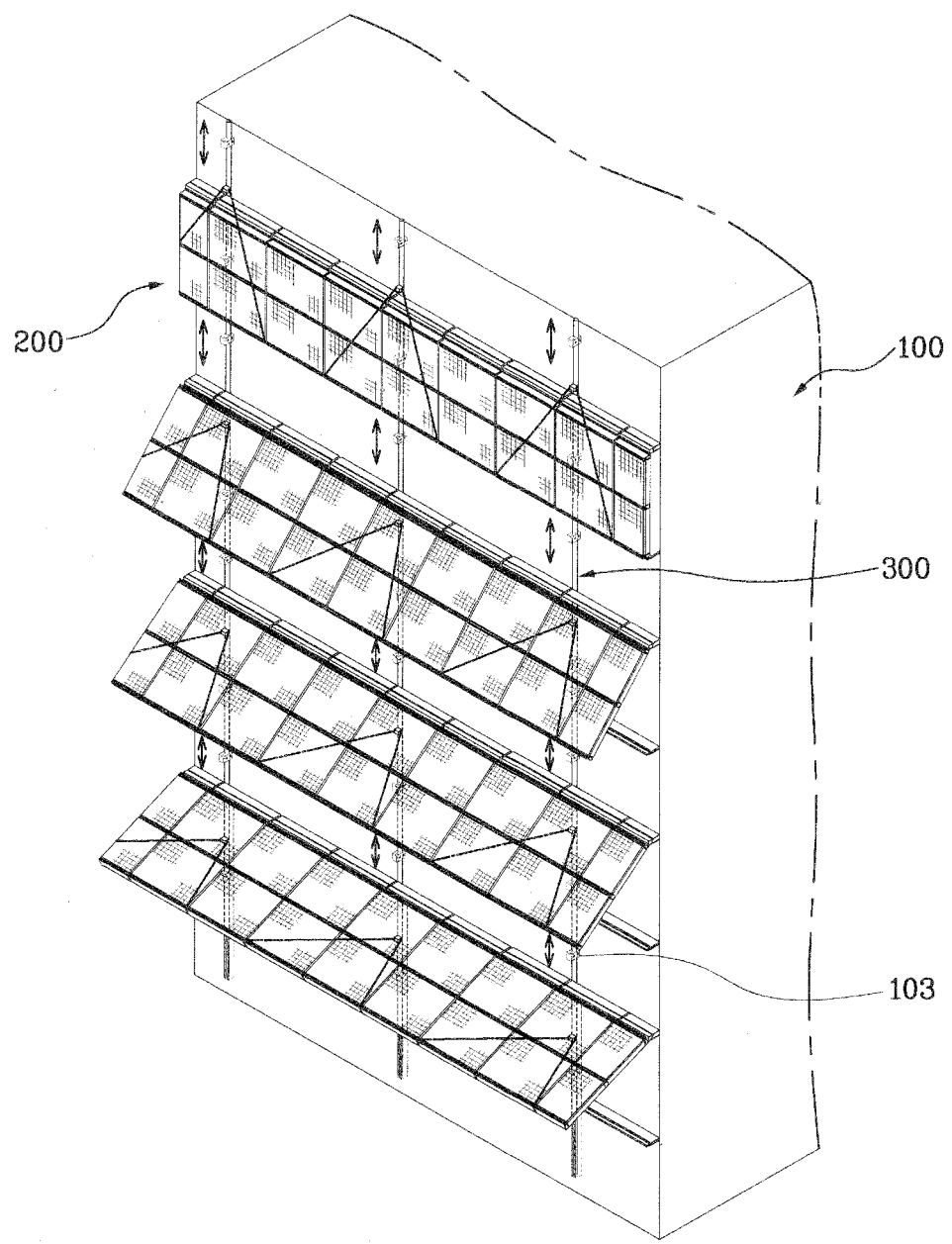
FIG. 3 is a perspective view of FIG. 2.
Figure 4:
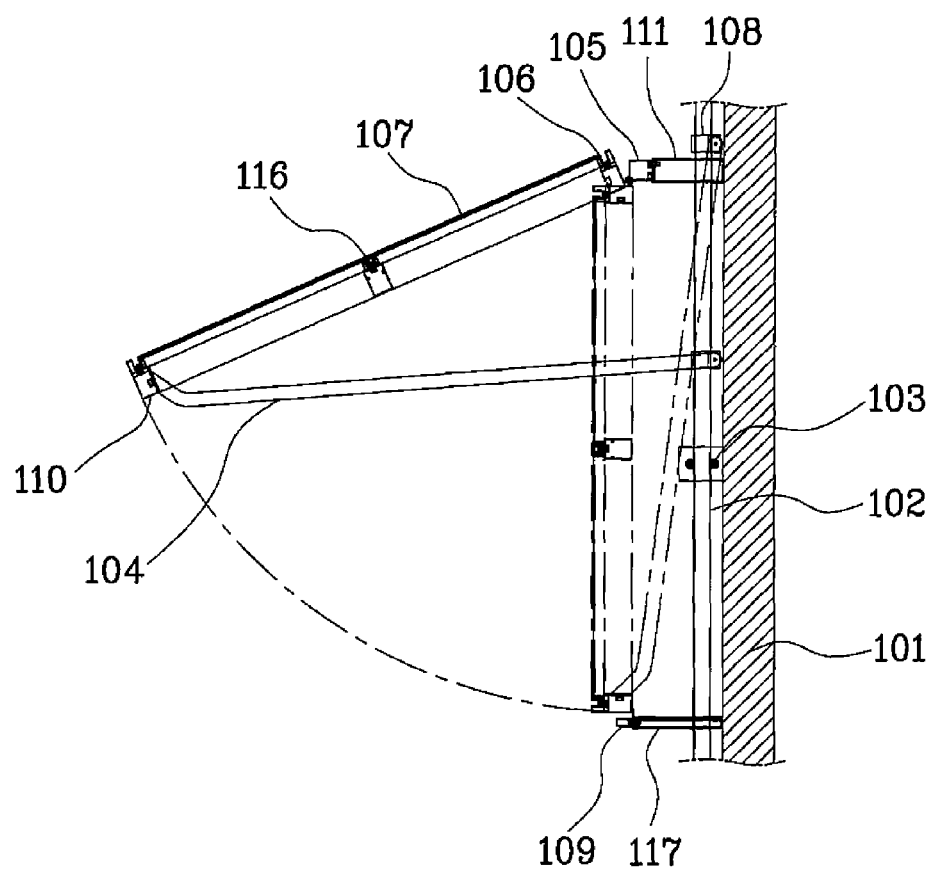
FIG. 4 is a detailed side sectional view illustrating a main part of FIG. 2.
Figure 5:
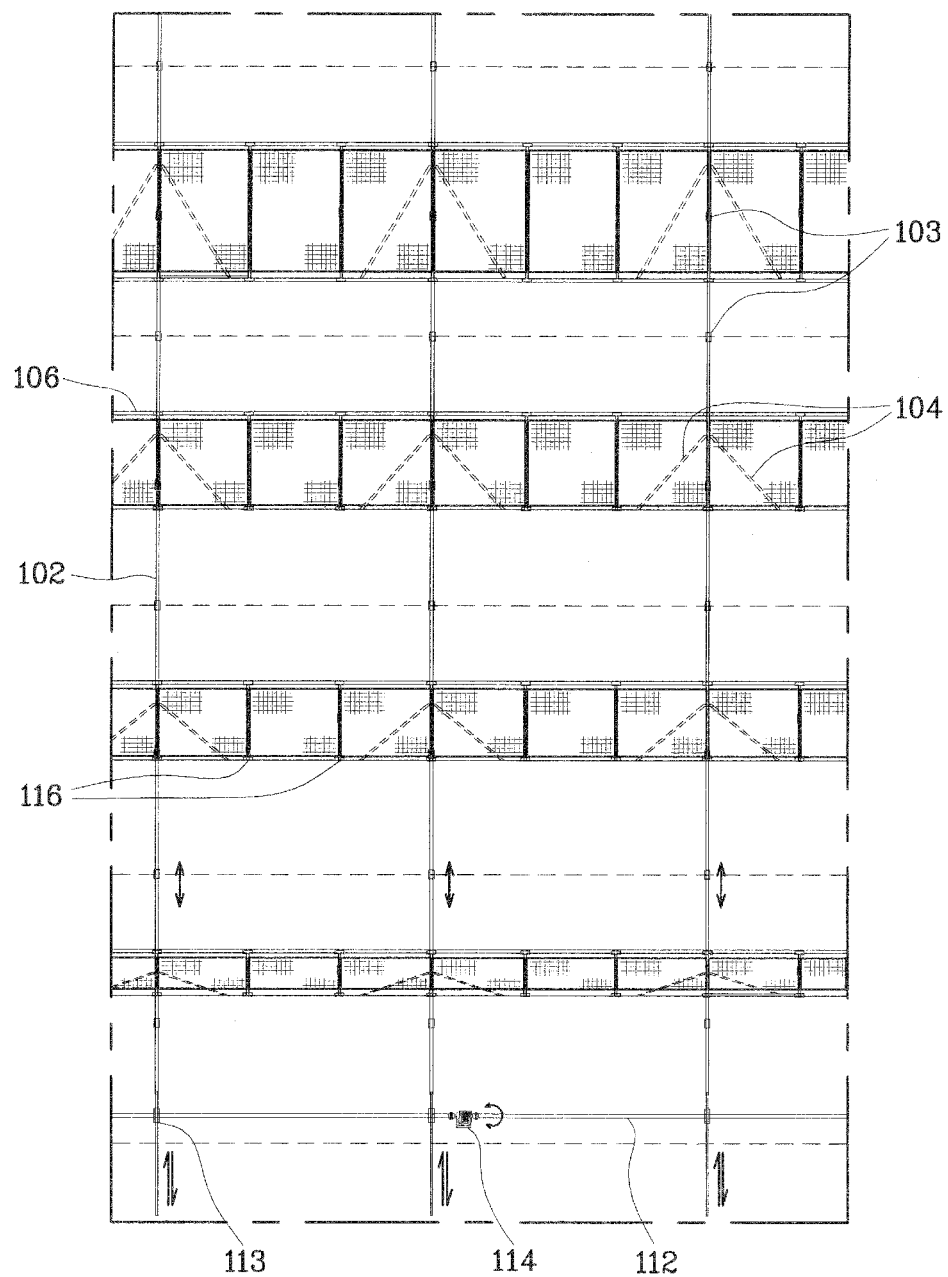
FIG. 5 is a front view of FIG. 2.

FIG. 2 is a side sectional view illustrating an apparatus for tracking and condensing sunlight of a wall installation type according to a preferred embodiment of the present invention; FIG. 3 is a perspective view of FIG. 2; FIG. 4 is a detailed side sectional view illustrating a main part of FIG. 2, and; FIG. 5 is a front view of FIG. 2.

As illustrated in the drawings, the apparatus for tracking and condensing sunlight of the wall installation type according to the present invention includes a wall means 100, a sunlight condensing means 200 for condensing sunlight and formed on a side surface of the wall means 100, and an opening and closing means 300 for adjusting condensing angle by opening or closing an end of the sunlight condensing means 200.

The wall means 100 is a structure placed in vertical direction on ground. The wall means 100 includes a wall 101 formed in the upper or lower direction vertically, wall brackets 111 and 117 protruded and formed with an upper end and a lower end of the wall 101, respectively.

A plurality of the sunlight condensing means 200 can be arranged onto the wall means 100 in the horizontal and vertical directions, respectively. An opening part 115 having opened spaces at constant intervals is formed among the plurality of the sunlight condensing means 200. The wall means 100 is a wall structure desirably selected from factory walls, soundproof walls, open type structures, steel structures, and bulkheads.

The sunlight condensing means 200 condenses sunlight by installing onto a side surface of the wall means 100, and sunlight condensing means 200, as shown in FIG. 4, includes a hinge fixing bar 105 formed in an upper part of the wall bracket 111 and having a pivoting hinge, an opening and closing hinge bar 106 hinge-coupled with the hinge fixing bar 105, a vertical bar 116, extended and formed in the upper or lower direction vertically from the opening and closing hinge bar 106 to pivot with together, an opening and closing lower bar 110 formed in an end of the vertical bar 116, solar cell 107 for condensing sunlight and formed in front of a structure extended from the opening and closing hinge bar 106, the vertical bar 116, and the opening and closing lower bar 110, and a lower bar 109 formed in the lower part of the wall bracket 107, and coupled and supported with the opening and closing lower bar 110.

The opening and closing means 300 opens or closes the end of sunlight condensing means 200 and adjusts the condensing angle. The opening and closing means 300, as shown in FIG. 5, includes a motor 114, a driving pipe 112 for rotating in left or right direction horizontally by extending to an axis of the motor 114, a rack pinion 113 for converting the rotating motion of the driving pipe 112 into a linear motion in the left-right direction horizontally, a driven pipe 102 coupled with the rack pinion 113 and performs linear motion in the upper or lower direction vertically, a pipe roller 103 for fixing the driven pipe 102 onto the wall 101 and smoothly guiding the linear motion in the upper or lower direction vertically, and a push rod 104 for adjusting the angle of solar cell 107 by pushing or pulling to the outside of the wall the opening or closing lower bar 110 according to the upper or lower motion of the driven pipe 102 by combining an end of the push rod to the driven pipe 102 by using a pushing rod clamp 108 and by hinge-coupling the other end to the opening and closing lower bar 110.

Also, the end of the push rod 104 is fixed to one point of the pushing rod clamp 108 and the other end is supported at least two points more of the opening and closing lower bar 110 to form V shape.

Now, the operation of the apparatus for tracking and condensing sunlight of a wall installation type of the present invention will be described in detail.

First, at a non-operation mode, in other words, when the apparatus for tracking and condensing sunlight did not operate due to not exist sunlight at night or rainy days, the opening and closing means 300 closely adheres the sunlight condensing means 200 onto the wall means 100.

Thus, if the motor 114 is rotated, the driven pipe 112, extended to an axis of the motor 114 in a left or right direction horizontally, is also, rotated together, then the rack pinion 113 converts the rotating motion of the driving pipe 112 into a linear motion in the upper or lower direction vertically.

Then, the driven pipe 102 coupled with the rack pinion 113 is fixed onto the wall 101 by the pipe roller 103 and also performs the linear motion by guiding in the upper direction vertically.

Further, one end of the push rod 104 hinge-coupled with the driven pipe 102 through the pushing rod clamp 108 is moved to the upper direction vertically, thereby closely pulling the opening and closing lower bar 110 onto the wall 101.

Therefore, the solar cell 107, for condensing sunlight by forming in front of a structure extended to the vertical bar 116 and the opening and closing lower bar 110, is closely adhered to the wall 101 by pivoting the opening and closing hinge bar 106, the vertical bar 116, and the opening and closing lower bar 110, hinge-coupled to the hinge fixing bar 105 having a pivoting hinge formed in the wall bracket 111, to the wall 101 on the central of the upper end of the wall 101.

Meanwhile, when sunlight is condensed by using the apparatus for tracking and condensing sunlight, the opening and closing means 300 opens the end of the sunlight condensing means 200 and departs the sunlight condensing means 200 with a constant angle from the wall means 100.

If the motor is rotated, the driving pipe 112 extended to the axle of the motor 114 is rotated in left or right direction horizontally. And the rack pinion 113 converts the rotating motion of the driving pipe 112 into the linear motion in the upper or lower direction vertically.

Thus, the driven pipe 102 coupled with the rack pinion 113 is fixed to the wall 101 by the pipe roller 103 and performs the linear motion by guiding in the lower direction vertically.

Then, the push rod 104, of which one end is hinge-coupled with the driven pipe 102 through the pushing rod clamp 108, is moved to the lower direction vertically, thereby pushing the opening and closing lower bar 110 to an opposite direction of the wall 101.

Therefore, the solar cell 107, for condensing sunlight by forming in front of the structure extended to the vertical bar 116 and the opening and closing lower bar 110, is opened with the constant angle by pivoting the opening and closing hinge bar 106, the vertical bar 116, and the opening and closing lower bar 110, which is hinge-coupled to the hinge fixing bar 105 having a hinge formed in the wall bracket 111, onto the opposite direction of the wall 101 on the central of the upper end of the wall 101.

Here, the condensing angle is set with different condition in considering of the position of the Sun for each season of spring, summer, fall, winter. Thus, the condensing angle in spring and fall set greater than in winter, and more greater in summer than spring and fall.

Therefore, according to the present invention of the apparatus for tracking and condensing sunlight of the wall installation type, the condensing efficiency is improved according to variations of the altitude or orbit of the sunlight, and the utilization of installing place is also improved using the wall by installing the sunlight condensing apparatus for adjusting the condensing angle from the wall and by condensing efficiently sunlight after tracking the position of the Sun according to variations of season or altitude of the Sun.

INDUSTRIAL APPLICABILITY

The scope of the present invention is not limited to the embodiment described and illustrated above but is defined by the appended claims. It will be apparent that those skilled in the art can make various modifications and changes thereto within the scope of the invention defined by the claims. Therefore, the true scope of the present invention should be defined by the technical spirit of the appended claims.

The invention claimed is:

1. An apparatus for tracking sunlight of a wall installation type, comprising:
    a wall means;
    a sunlight harvesting means for harvesting sunlight by forming onto a side surface of the wall means; and
    an opening and closing means for adjusting harvesting angle by opening or closing an end of the sunlight harvesting means,
    wherein the wall means comprises:
    a wall formed in an upper or a lower direction vertically; and
    wall brackets protruded and formed in an upper end and a lower end of the wall, respectively,
    wherein the sunlight harvesting means comprises:
    a hinge fixing bar formed in an upper part of the wall bracket and having a pivoting hinge;
    an opening and closing hinge bar pivotally connected in the hinge fixing bar;
    a vertical bar extended and formed to an upper or an lower direction vertically from the opening and closing hinge bar to pivot with together;
    an opening and closing lower bar formed in an end of the vertical bar;
    solar cell for harvesting sunlight and formed in front of a structure extended from the opening and closing hinge bar, the vertical bar, and the opening and closing lower bar; and
    a lower bar formed in the lower end of the wall bracket, and connected and supported with the opening and closing lower bar,
    wherein the sunlight harvesting angle is adjusted by the opening and closing means, so as to maximize the harvesting of the sunlight in the solar cell of the sunlight harvesting means.

2. The apparatus as claimed in claim 1, wherein opening and closing means comprising:
    a motor;
    a driving pipe for rotating in left or right direction horizontally by extending to a rotatable axis of the motor;
    a rack pinion for converting a rotating motion of the driving pipe into a linear motion in the left or right direction horizontally;
    a driven pipe coupled with the rack pinion and performs a linear motion in the upper or lower direction vertically;
    a pipe roller for fixing the driven pipe onto the wall and smoothly guiding the linear motion in the upper or lower direction vertically; and,
    a push rod of which an end is fixed to the driven pipe by using a pushing rod clamp and the other end is hinge-coupled to the opening and closing lower bar; wherein, an adjustable angle of the solar cell is adjusted by pushing or pulling the opening and closing lower bar to an external side of the wall according to the upper or lower motion of the driven pipe.

3. The apparatus as claimed in claim 1, wherein the pushing rod have an end coupled with the pushing rod clamp, and the other end to coupled to at least two points of the opening and closing lower bar to be supported.

4. The apparatus as claimed in claim 1, wherein a plurality of the sunlight harvesting means are arranged onto the wall means in horizon or/and vertical direction(s).

5. The apparatus as claimed in claim 4, wherein the wall means comprises an opening part having each opened space with constant interval among the plurality of the sunlight harvesting means.

6. The apparatus as claimed in claim 1, wherein the wall means comprises at least a wall structure selected from factory walls, soundproof walls, open-type structures, steel structures, bulkheads.

* * * * *